(12) United States Patent
Rudolfi et al.

(10) Patent No.: US 10,953,733 B2
(45) Date of Patent: Mar. 23, 2021

(54) TOP HAVING A LOCKING MECHANISM

(71) Applicant: Webasto SE, Stockdorf (DE)

(72) Inventors: Christian Rudolfi, Stockdorf (DE); Magnus Sviberg, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 84 days.

(21) Appl. No.: 16/260,993

(22) Filed: Jan. 29, 2019

(65) Prior Publication Data

US 2019/0241054 A1 Aug. 8, 2019

(30) Foreign Application Priority Data

Feb. 5, 2018 (DE) ...................... 10 2018 102 520.3
Aug. 7, 2018 (DE) ...................... 10 2018 119 208.8

(51) Int. Cl.
*B60J 7/12* (2006.01)
*B60J 7/16* (2006.01)
*B60J 7/185* (2006.01)

(52) U.S. Cl.
CPC ............. *B60J 7/1265* (2013.01); *B60J 7/126* (2013.01); *B60J 7/1692* (2013.01); *B60J 7/1855* (2013.01)

(58) Field of Classification Search
CPC . B60J 7/1265; B60J 7/1226; B60J 7/10; B60J 7/1204; B60J 10/90; B60J 7/0069; B60J 7/123; B60J 7/1243; B60J 7/146; B60J 1/1815
USPC ...... 296/107.09, 107.07, 116, 121, 108, 118, 296/224, 221, 216.04; 29/407.09, 407.01, 29/466, 464, 467, 468, 897.2, 559
See application file for complete search history.

(56) References Cited

U.S. PATENT DOCUMENTS

| 6,585,310 | B1 * | 7/2003 | Guillez | B60J 1/1823 296/107.01 |
| 7,118,162 | B2 * | 10/2006 | Queveau | B60J 7/145 296/108 |
| 7,513,563 | B2 * | 4/2009 | Guillez | B60J 7/146 296/107.17 |
| 7,992,919 | B2 * | 8/2011 | Huotari | B60J 7/1265 296/107.09 |

(Continued)

FOREIGN PATENT DOCUMENTS

| DE | 102007015704 A1 | 10/2008 |
| DE | 102007015706 A1 | 10/2008 |
| DE | 102008061211 A1 | 6/2010 |

*Primary Examiner* — D Glenn Dayoan
*Assistant Examiner* — Sunsurraye Westbrook
(74) *Attorney, Agent, or Firm* — Fitch, Even, Tabin & Flannery, LLP

(57) ABSTRACT

The invention relates to a top for a convertible vehicle, comprising a top cover and a top linkage which is displaceable between a covering position, in which a vehicle interior is covered, and a storage position, in which the vehicle interior is uncovered, and which comprises a link assembly on either side of a vertical longitudinal center plane of the vehicle, each link assembly being pivotably mounted on a vehicle-attached main bearing and securable in at least two positions of the top linkage by means of a locking device comprising a lock element disposed on a first link of the link assembly, a first lock counterelement, and a second vehicle-attached lock counterelement. The first lock counterelement of each locking device is disposed on a second link of the respective link assembly.

13 Claims, 11 Drawing Sheets

(56) References Cited

U.S. PATENT DOCUMENTS 8,070,218 B2 * 12/2011 Hinrichs ................ B60J 7/1855
  296/224
2014/0300131 A1 * 10/2014 Kopp ..................... B60J 7/1856
  296/116

* cited by examiner

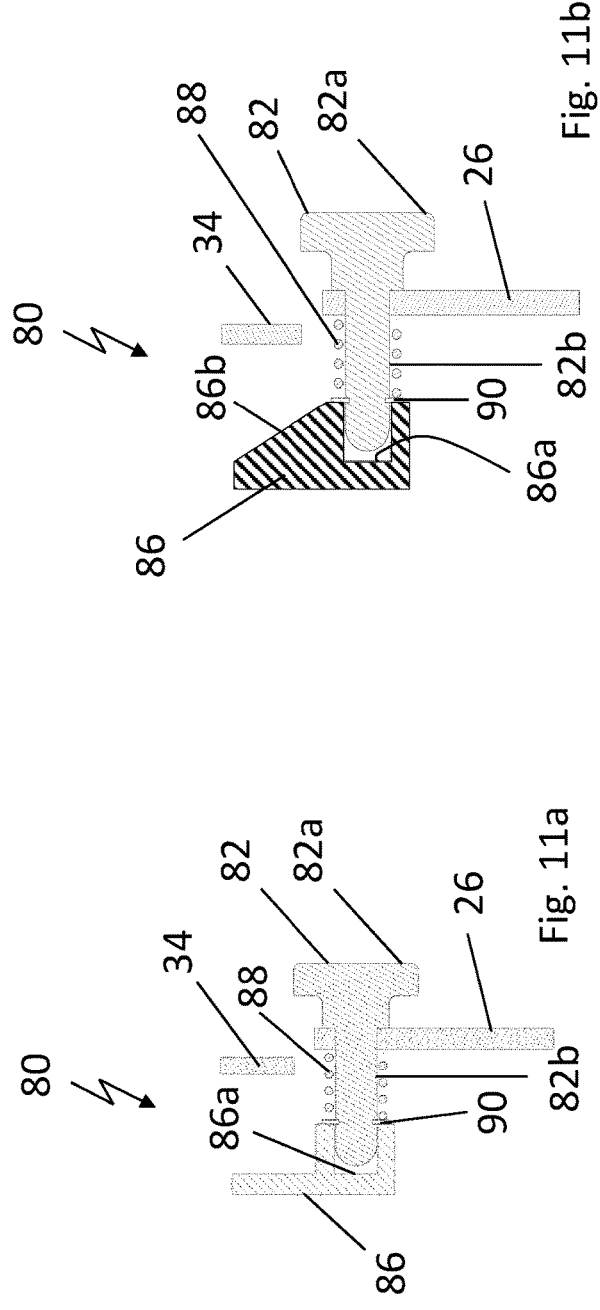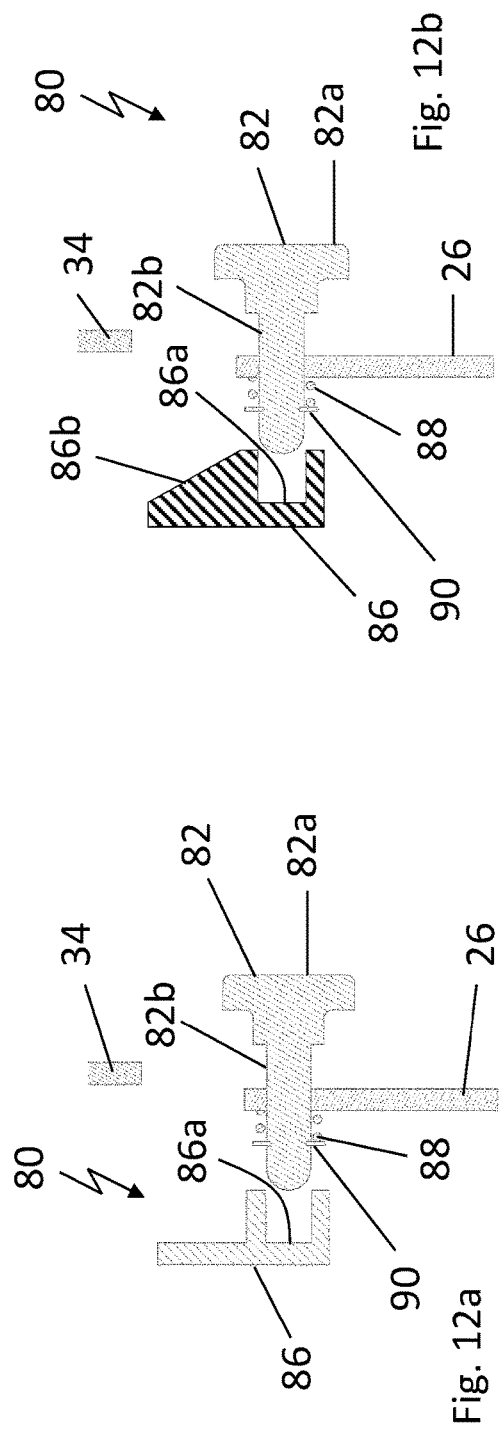

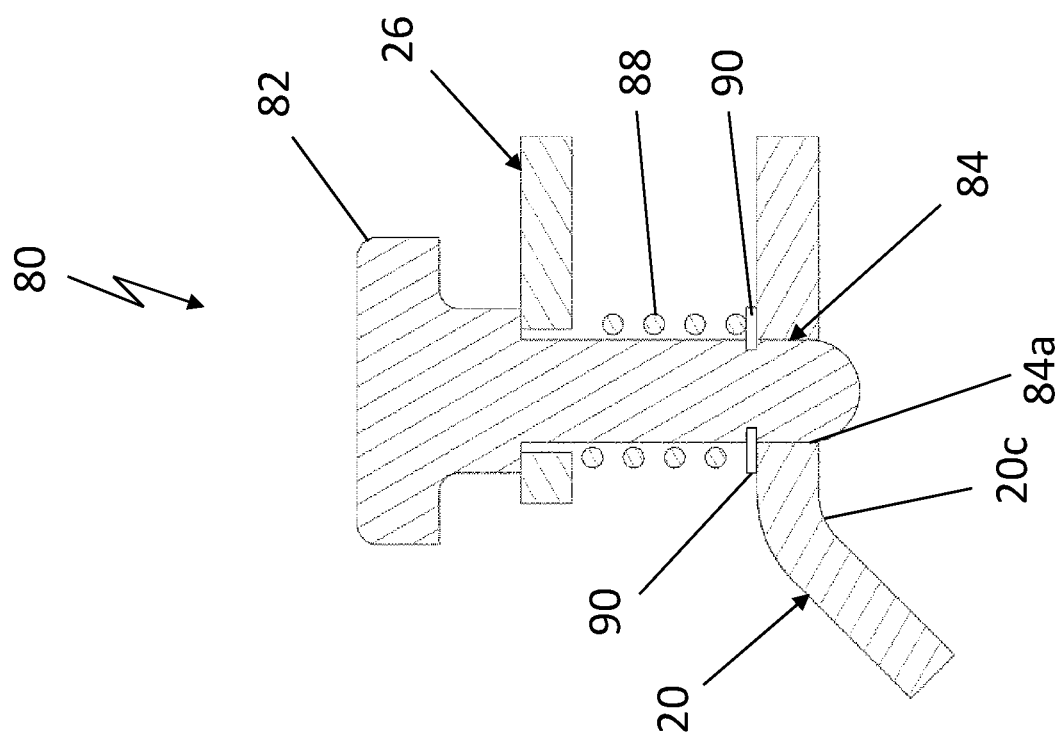

TOP HAVING A LOCKING MECHANISM

CROSS-REFERENCE TO RELATED APPLICATIONS

This application claims priority from German Patent Application Number DE 10 2018 102 520.3, filed Feb. 5, 2018, and German Patent Application Number DE 10 2018 119 208.8, filed Aug. 7, 2018, which is hereby incorporated herein by reference in its entirety for all purposes.

FIELD

The invention relates to a top of a convertible vehicle having the features of the preamble of claim 1 and to a convertible vehicle having such a top.

BACKGROUND

A top of this kind is known from practice and is a displaceable roof of a convertible vehicle. It comprises a top cover and a top linkage, which can be displaced together between a covering position, in which a vehicle interior is covered, and a storage position, in which the vehicle interior is uncovered. On either side of a vertical longitudinal center plane of the top, the top linkage has a link assembly which is pivotably mounted on a vehicle-attached main bearing and which can be secured in at least two positions of the top linkage by means of a locking device. The bilaterally disposed locking devices each comprise a lock element disposed on the respective link assembly and two lock counterelements disposed in attachment to the vehicle. Accordingly, the locking devices of the top known from practice each require at least two interfaces with the vehicle. This is accompanied by a high amount of constructive work.

Therefore, the object of the invention is to provide a top of a convertible vehicle in which the number of vehicle-attached interfaces for a locking device is reduced such that the top is characterized by little constructive work and low complexity, and to provide a convertible vehicle having such a top.

SUMMARY

According to the invention, said object is attained by the top having the features of claim 1 and by the convertible vehicle having the features of the claims.

Thus, a top for a convertible vehicle is proposed, said top comprising a top cover and a top linkage which is displaceable between a covering position, in which a vehicle interior is covered, and a storage position, in which the vehicle interior is open at the top (i.e. uncovered). The top linkage has a link assembly on either side of a vertical longitudinal center plane of the vehicle, each link assembly being pivotably mounted on a vehicle-attached main bearing and securable in at least two positions of the top linkage by means of a locking device. The locking devices each comprise a lock element disposed on a first link of the respective link assembly, a first lock counterelement formed on a second link of the respective link assembly, and a second vehicle-attached lock counterelement.

Hence, in the proposed top, the first lock counterelements of the locking devices are not attached to the vehicle but disposed on the respective link assembly, which means that in contrast to the top known from practice, one less vehicle-attached interface is required per locking device in order to secure the top linkage in at least two positions. The locking device of the top according to the invention constitutes a simple securing mechanism of the top linkage which can be realized with little constructive work and at low cost and weight.

In a specific embodiment of the top according to the invention, the lock elements and the second lock counterelements together secure the top linkage in the storage position. Thus, no additional components for securing the storage position are needed in the area of the storage space.

In a preferred embodiment of the top according to the invention, the lock elements and the second lock counterelements secure the top linkage in the covering position and/or in an intermediate position in which the vehicle interior is partially uncovered. This ensures that the top, when in the covering position and/or in the intermediate position, cannot be displaced further in the direction of the storage position by external forces acting on the top.

In an advantageous embodiment of the top according to the invention, the first links of the bilaterally disposed link assemblies are each formed by a roof link which, when in the covering position, is assigned to a roof side beam and extends in the longitudinal direction of the top. The second links of the link assemblies are preferably each formed by a main link which is pivotably mounted on a main bearing and which is pivotably connected to the respective roof link.

In a preferred embodiment of the top according to the invention, the main links of the bilaterally disposed link assemblies each comprise a long leg and a short leg, the short leg extending in the longitudinal direction of the vehicle. The long legs each extend in the vertical direction of the vehicle and are pivotably mounted on the respective vehicle-attached main bearing. Furthermore, a protrusion having the respective first locking counterelement is formed on each of the long legs of the main links. The protrusions extend forward in the longitudinal direction of the vehicle and each preferably form a ramp for the lock element. As the top linkage is being displaced, the ramp pushes the lock element in a positively controlled manner into an open position, i.e. positively opens the lock element. When the lock element reaches the lock counterelement, which is in particular formed by a recess, the lock element latches into said lock counterelement.

The roof links of the bilaterally disposed link assemblies can each be pivotably connected to a respective front roof link, wherein the roof links and the respective front roof link together can each form a roof side beam. Owing to the front roof links, the top linkage can be pivoted into an intermediate position in which the vehicle interior is partially uncovered, the rear roof links being secured by the locking device configured according to the invention.

In a preferred embodiment of the top according to the invention, the lock elements each comprise a knob and a cylindrical shaft which, when in the installed state, extends in particular in the transverse direction of the vehicle, which facilitates manual operation.

Also, the lock elements can each comprise a spring device which acts in the direction of an engaged position. The spring devices can each comprise a spring and a securing element and can cause the lock element to automatically return to an engaged position and ensure that the top linkage is secured when it reaches the first and second lock counterelements.

The springs are helical springs, for example, which are each secured on the shaft of the respective lock element by the securing element. The securing elements can be securing rings which each engage into a corresponding groove of the respective shaft.

In a specific embodiment of the top according to the invention, the lock counterelements of the locking devices each comprise a recess corresponding to the respective lock element. Thus, the lock elements can engage into said recess when reaching the respective lock counterelement, the top linkage thus being secured.

The second lock counterelements can each comprise a bevel which forms a ramp for the lock element. In a positively controlled manner, the bevel shifts the lock element outward in particular in the transverse direction of the vehicle against the spring force of the spring as the top linkage is being displaced. When the lock element reaches the end position, it latches into the corresponding lock counterelement or recess of the corresponding lock counterelement, rendering manual interaction for securing the top linkage in the respective position unnecessary.

In an advantageous embodiment of the top according to the invention, the bilaterally disposed link assemblies each comprise a main four-bar linkage which is composed of the main link mounted pivotably in attachment with the vehicle, of the roof link, and of a second main link mounted pivotably in attachment with the vehicle, which corresponds to a common linkage design of a top.

According to another aspect, a convertible vehicle which comprises a top of the kind described above is proposed.

The convertible vehicle is an off-road vehicle or a sport utility vehicle, for example.

In an advantageous embodiment, the convertible vehicle comprises a roll cage. The roll cage can comprise, on either side of the vertical longitudinal center plane of the vehicle, a roll bar which extends in the longitudinal direction of the vehicle and on which the second lock counterelement of the locking device is disposed. Since roll cages are components which are part of the vehicle anyway, no additional components are needed for attaching the second lock counterelements to the vehicle.

An embodiment of a convertible vehicle having a top according to the invention is illustrated in a schematically simplified manner in the drawing and will be explained in more detail in the following description.

BRIEF DESCRIPTIONS OF THE DRAWING

FIG. 11a is a section along line XI-XI in FIG. 9, showing the locking device in an engaged position;

FIG. 11b shows an alternative embodiment of the locking device illustrated in FIG. 11a;

FIG. 12a is a view corresponding to FIG. 11a, showing the locking device in an open position while the top linkage is in the covering position;

FIG. 12b is a view corresponding to FIG. 11b, showing the locking device in an open position; and FIG. 13 is a section through the locking device in the storage position with the locking device in the engaged position.

DETAILED DESCRIPTION

Figure 1:
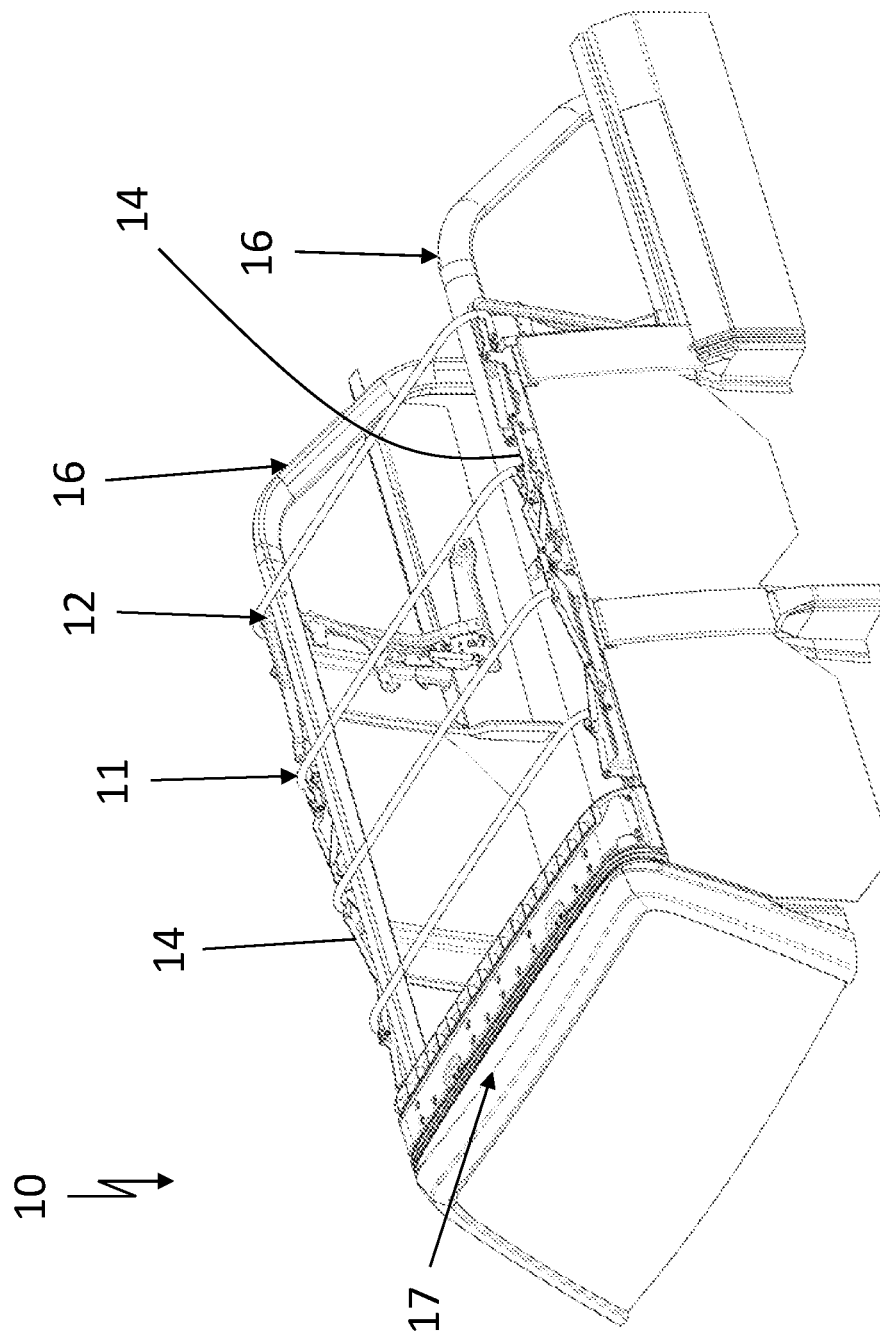
FIG. 1 is a perspective side view of a convertible vehicle with a top in a covering position, a top cover being omitted.
Figure 2:
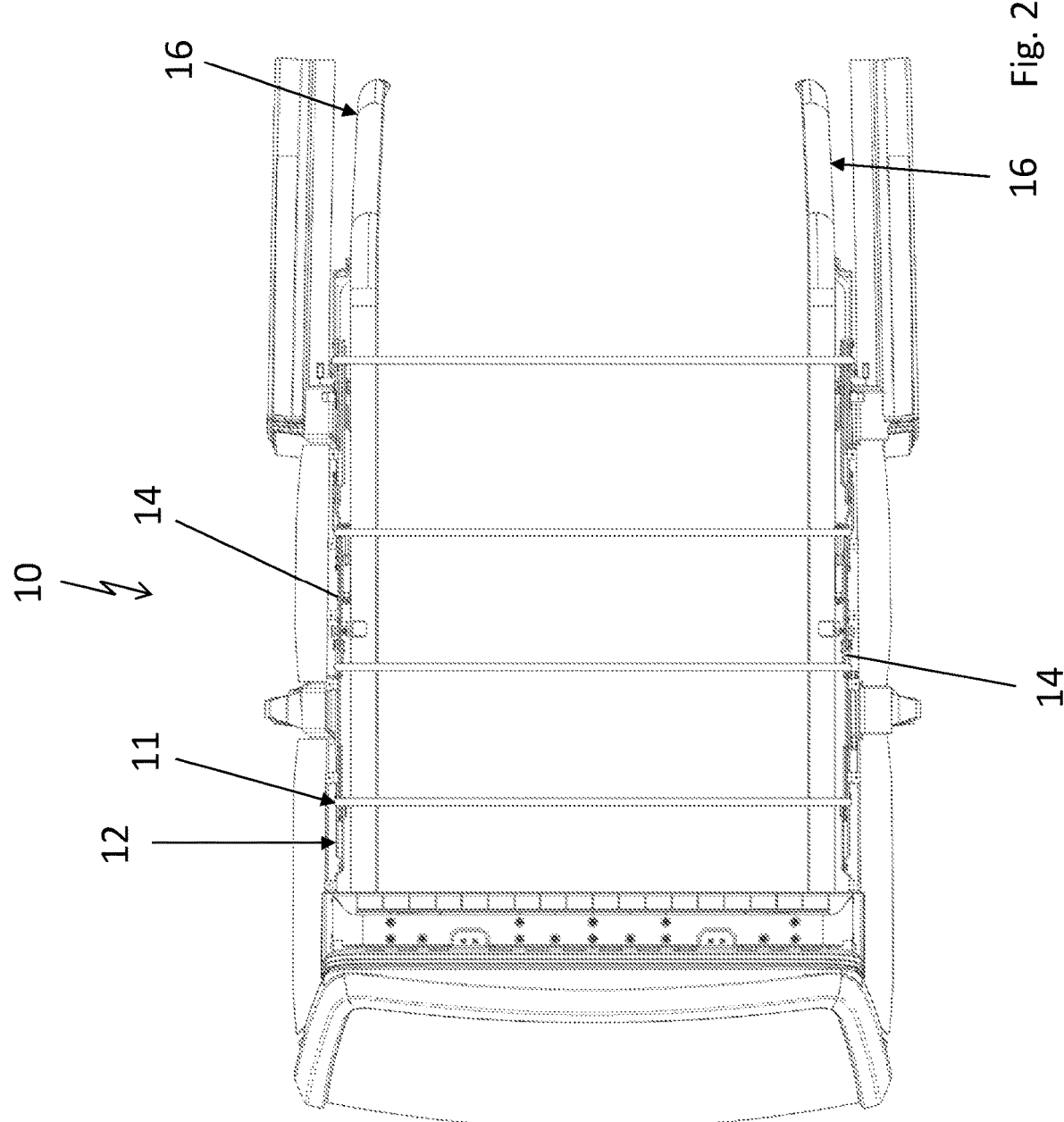
FIG. 2 is a plan view of the convertible vehicle of FIG. 1 in the covering position.

FIG. 1 shows a convertible vehicle 10 which comprises a top 11, realized as a folding top, as a vehicle roof. In a covering position as illustrated in FIGS. 1 to 4 and 6, in which a vehicle interior is covered at the top, top 11 extends between a front header 17 and at least one rear edge extending in the transverse direction of the vehicle and forming an area of transition to a rear portion or cargo space of the vehicle. Front header 17 forms an upper leg of a windshield frame, said upper leg extending in the transverse direction of the vehicle. In the covering position, top 11 also covers roll bars 16 which extend in the longitudinal direction of the vehicle and are part of a roll cage.

Figure 8:
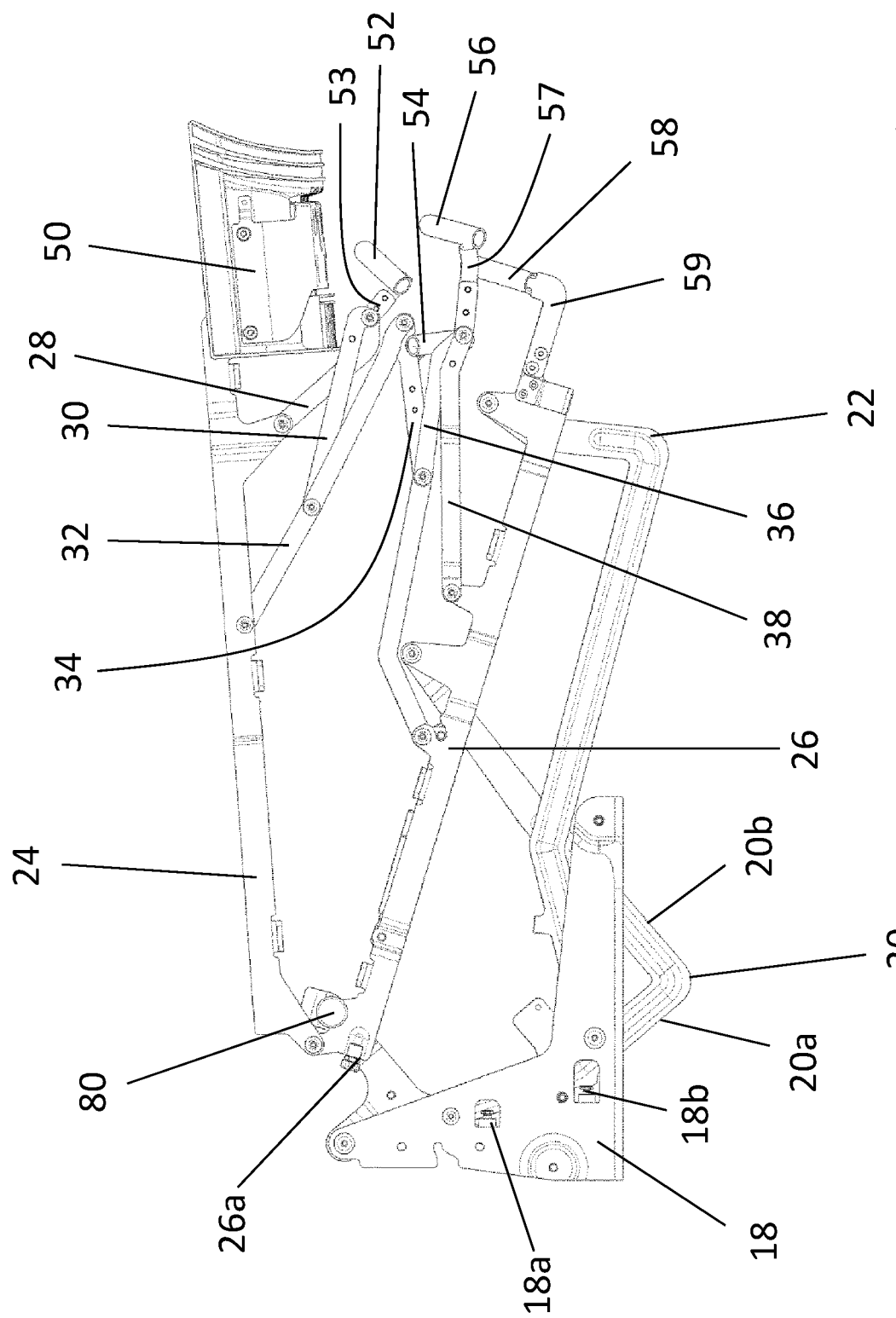
FIG. 8 is a view corresponding to FIG. 7, showing the top linkage in a storage position.
Figure 10:
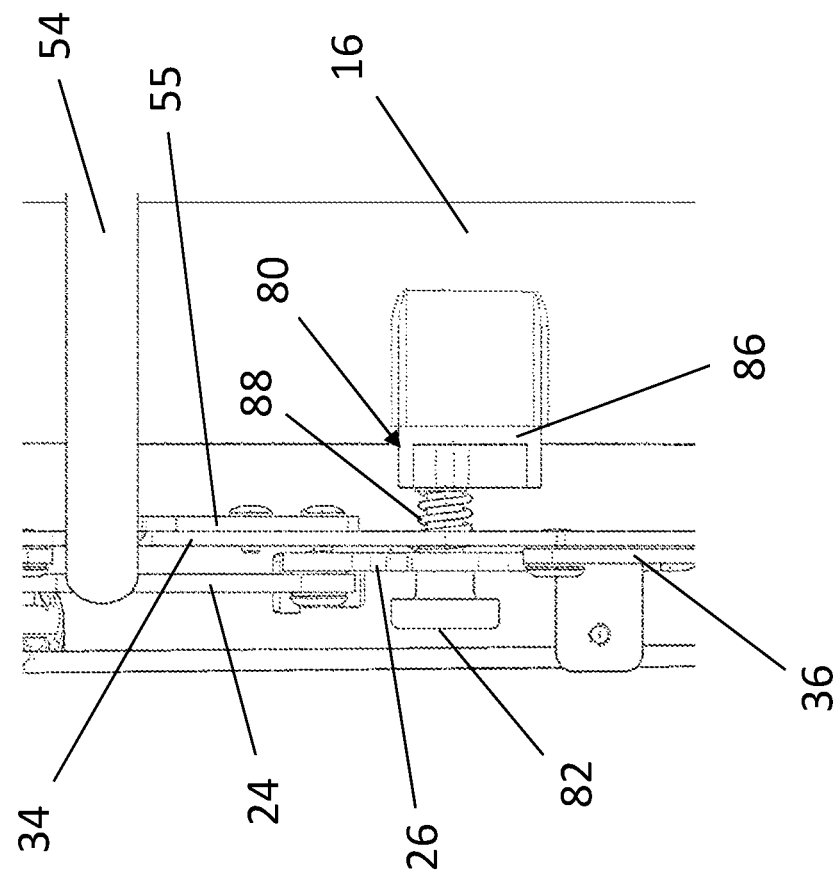
FIG. 10 is a plan view of the area of the top linkage in the covering position shown in FIG. 9.
Figure 9:
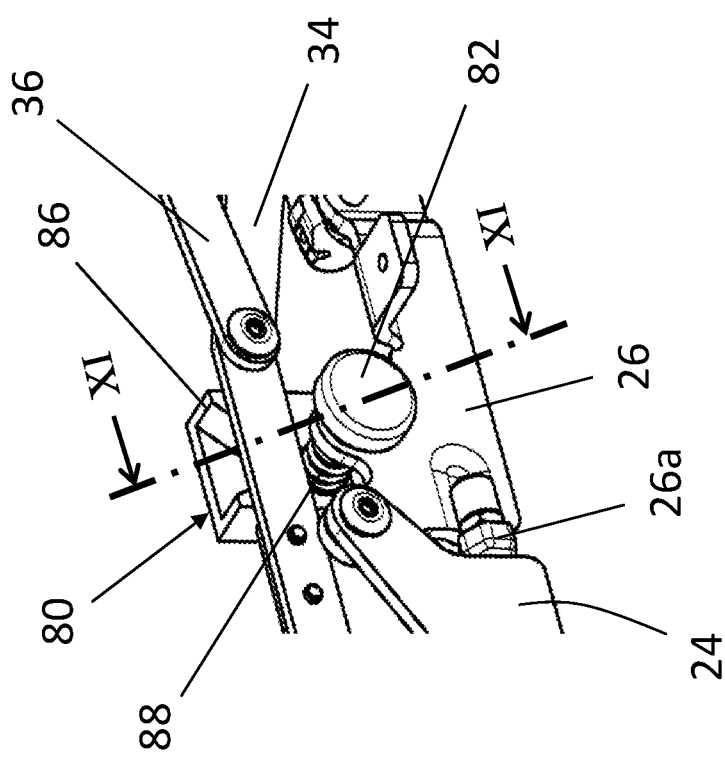
FIG. 9 is a perspective partial view of an area of the top linkage in the covering position which comprises a locking device.

Top 11 has a top cover 13 and a top linkage 12. Top cover 13 can be displaced between the covering position and a storage position, which is illustrated in FIG. 8, by means of top linkage 12. In the storage position, the vehicle interior is uncovered and top 11 is stored in a rear storage space of the vehicle body.

Top linkage 12 comprises a link assembly 14 on either side of a vertical longitudinal center plane of the top. Link assemblies 14 are mirror-symmetrical with respect to the longitudinal center plane of the vehicle, which is why, for the sake of clarity, only link assembly 14 on the left with respect to the forward direction of travel of vehicle 10 will be described below.

Link assembly 14 has a first main link 20 and a second main link 22, which are each pivotably mounted on a vehicle-attached main bearing 18. Vehicle-attached main bearing 18 comprises two stop elements 18a and 18b, second main link 22 being in contact with stop element 18a when top linkage 12 is in the covering position and first main link 20 being in contact with second stop element 18b when top linkage 12 is in the storage position. First main link 20 has a long leg 20a extending in the vertical direction of the vehicle when in the covering position and a short leg 20b extending in the in longitudinal direction of the vehicle when in the covering position. A protrusion 20c which extends substantially parallel to short leg 20b is formed on long leg 20a.

First main link 20 and second main link 22 are each pivotably connected to a rear roof link 26 which extends in the longitudinal direction of the vehicle when top linkage 12 is in the covering position. At a front end in the longitudinal direction of the vehicle, rear roof link 26 is pivotably connected to a front roof link 24. Front roof link 24 and rear roof link 26 together form a roof side beam when top linkage 12 is in the covering position. In the covering position, front roof link 24 is in contact with a stop element 26a of rear roof link 26.

A bow link 34 and a link 38 which form a four-bar linkage with a bow link 36 and the rear roof link 26 are pivotably mounted on the rear roof link 26. The front roof link 24 and a bow link 28, a coupling link 30, and a link 32 together form another four-bar linkage.

Bilaterally disposed link assemblies 14 are connected to each other via a front bow 50 and via transverse bows 52, 54, 56 and 58 each extending in the transverse direction of the vehicle. When top linkage 12 is in the covering position, transverse bow 58 forms an area of transition between the roof portion and the cargo space of the vehicle. Transverse bows 52, 56 and 58 extend in the transverse direction of the vehicle and, at their ends, they are each connected to a bow holder 53, 57 and 59, respectively, on either side. Bow holders 53 are each pivotably connected to respective front roof link 24 via respective bow link 28. Bow holders 57 are each pivotably connected to respective rear roof links 26 via respective bow link 34 and respective link 38, respectively. Rear roof link 26 is rigidly connected to transverse bow 58 via bilaterally disposed bow holders 59. Transverse bow 54 sits on bow links 34.

Figure 3:
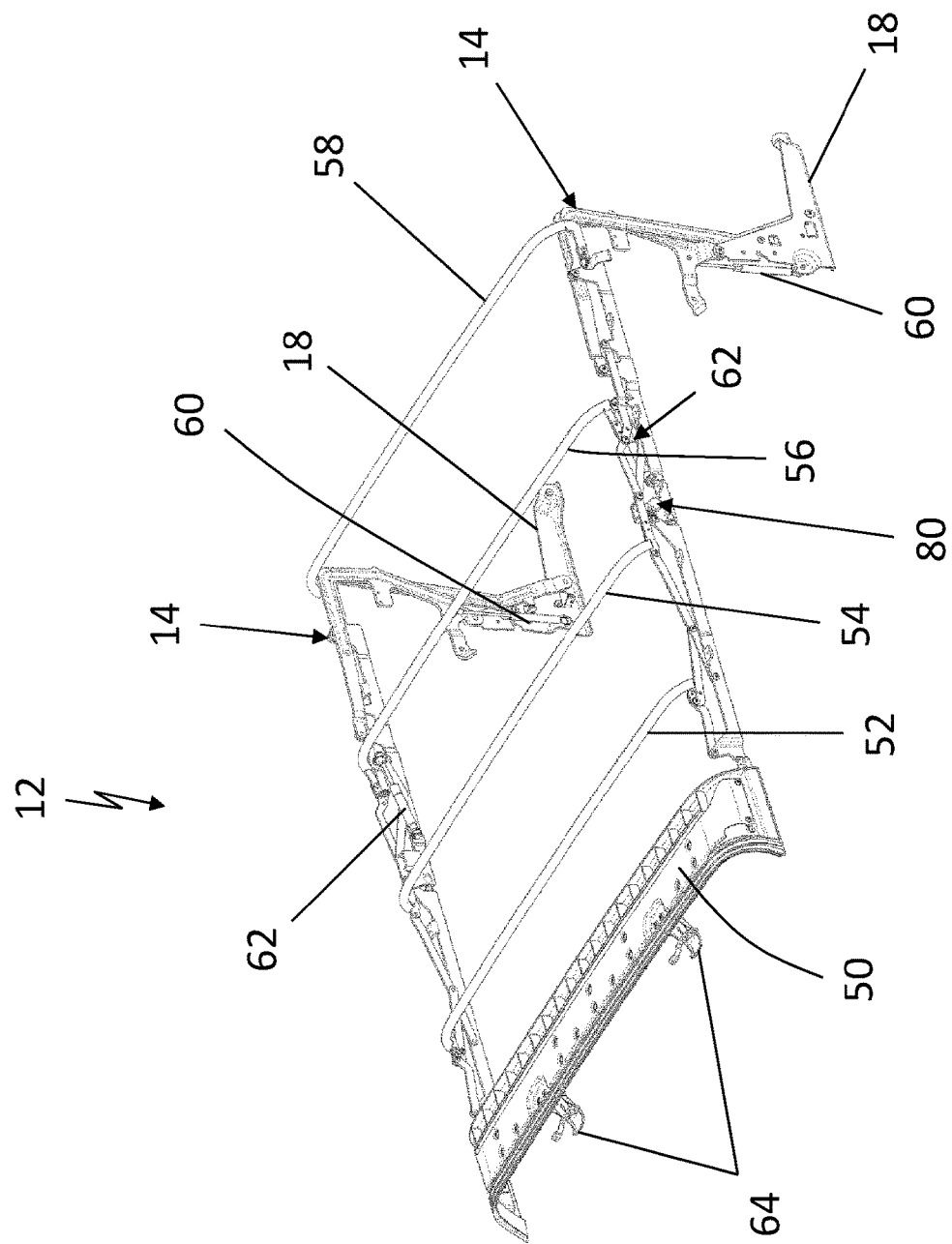
FIG. 3 is a perspective view of a top linkage of the top in the covering position.

As illustrated in FIG. 3, securing elements 64 are disposed on front bow 50, said securing elements 64 securing top 11 to front header 17 of vehicle 10 in the covering position, unintentional displacement of top 11 thus being precluded.

Furthermore, a locking device 80 is formed for each of bilaterally disposed link assemblies 14, said locking device 80 securing top linkage 12 against unintentional displacement in the covering position and in the storage position. Locking devices 80 each comprise a lock element 82 and two lock counterelements 84 and 86.

Each lock element 82 has a cylindrical shaft 82b and a knob 82a. Cylindrical shafts 82b extend in the transverse direction of the vehicle and penetrate a recess of respective rear roof link 26. Knob 82a for manual operation is formed on each of the ends of cylindrical shafts 82b which face away from the vehicle interior.

A spring 88, in particular a helical compression spring, is slid onto each of shafts 82b of lock elements 82, said spring 88 pushing respective lock element 82 into an engaged position. In the engaged position, the ring surfaces of knobs 82a of lock elements 82 which face the vehicle interior are each in contact with a side surface of respective rear roof link 26 which faces away from the vehicle interior. Springs 88, which are supported on roof links 26, are each secured by means of a securing ring 90 which engages into a groove of respective shaft 82b.

In FIGS. 11a, 11b, 12a and 12b, alternative embodiments of locking device 80 are illustrated, which differ in the design of lock counterelement 86 disposed on roll bar 16 in attachment to the vehicle.

In the embodiment of locking device 80 illustrated in FIGS. 11a and 12a, lock counterelement 86 has an inverted F-shaped cross-section. Hence, in order to secure top 11 in the covering position or in the intermediate position, lock element 82 has to be subjected to a force which acts outward in the transverse direction of the vehicle and which is greater than the spring force of spring 88 and which moves lock element 82 from the engaged position outward in the transverse direction of the vehicle. Thus, top linkage 12 can be pivoted further until lock element 82 is located opposite recess 86a of lock counterelements 86. When the manual force acting on lock element 82 is released, lock element 82 will return to the engaged position. In doing so, it will enter recess 86a of lock counterelement 86.

In the embodiment of locking device 80 illustrated in FIGS. 11b and 12b, lock counterelement 86 comprises a bevel 86b which positively shifts lock element 82 outward in the transverse direction of the vehicle against the spring force of spring 88 as top linkage 12 is being displaced. When lock element 82 reaches recess 86a of lock counterelement 86, lock element 82 will automatically return to the engaged position owing to the spring force of spring 88 acting inward, top linkage 12 thus being secured. In FIG. 13, locking device 80 is illustrated in an engaged position while tip linkage 12 is in the storage position. Lock element 82 penetrates lock counterelement 84 of first main link 20, lock counterelement 84 having a recess 84a, whereby top linkage 12 is secured in the storage position. Lock counterelement 84 is formed on protrusion 20c of long leg 20a, said long leg 20a comprising a ramp which positively guides lock element 82 toward lock counterelement 84 as top linkage 12 is being displaced.

Figure 4:
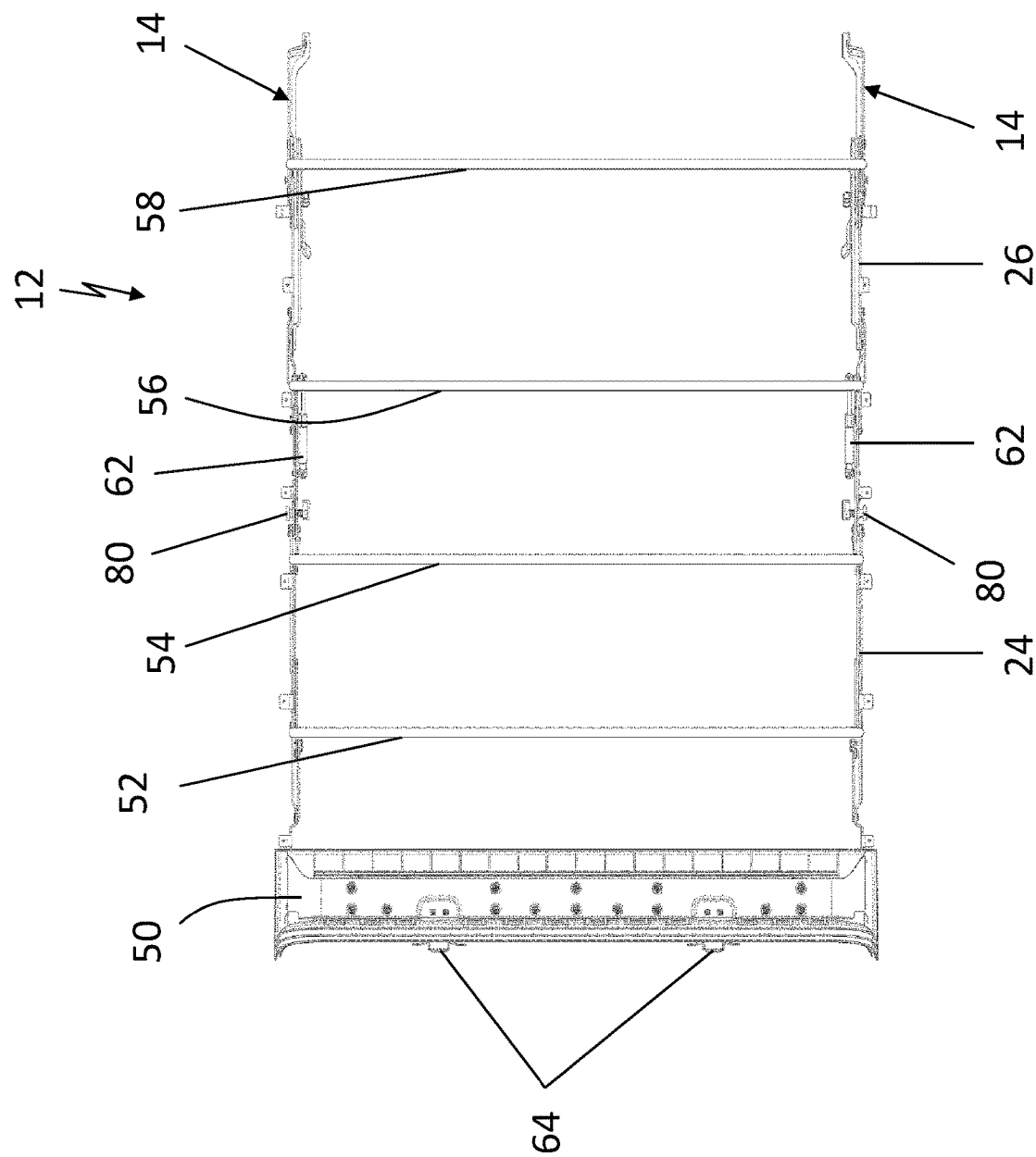
FIG. 4 is a plan view of the top linkage of FIG. 3 in the covering position.
Figure 5:
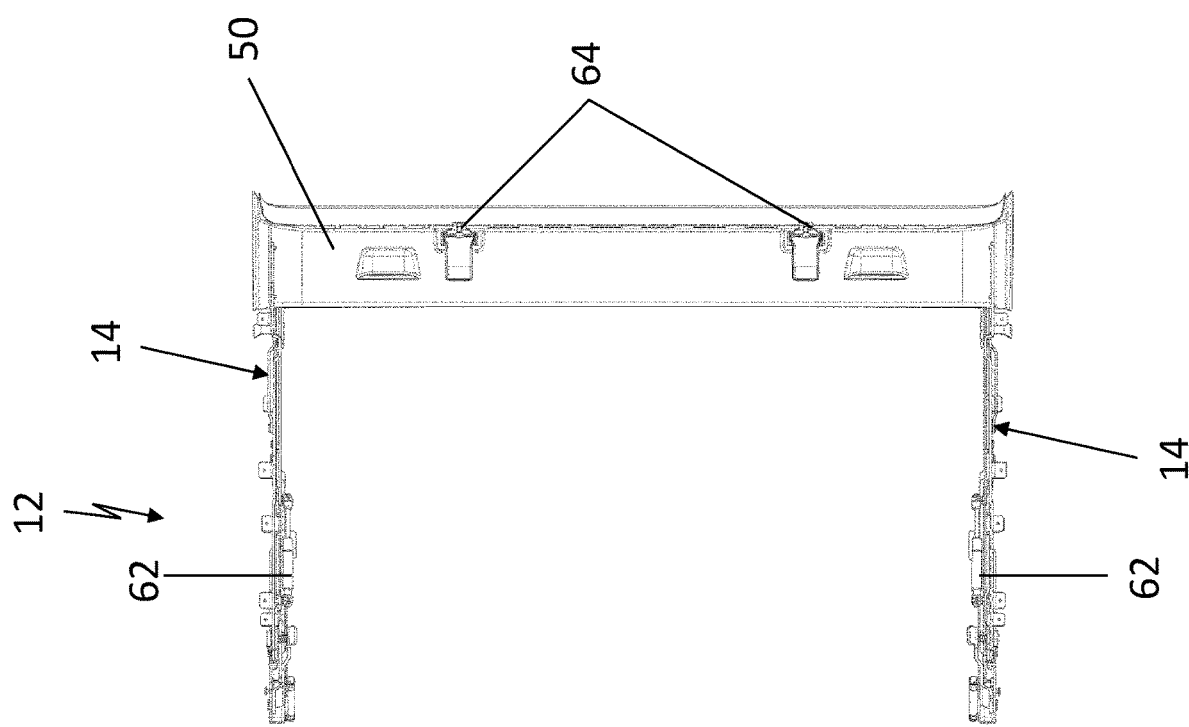
FIG. 5 is a view corresponding to FIG. 4, showing the top linkage in an intermediate position.
Figure 6:
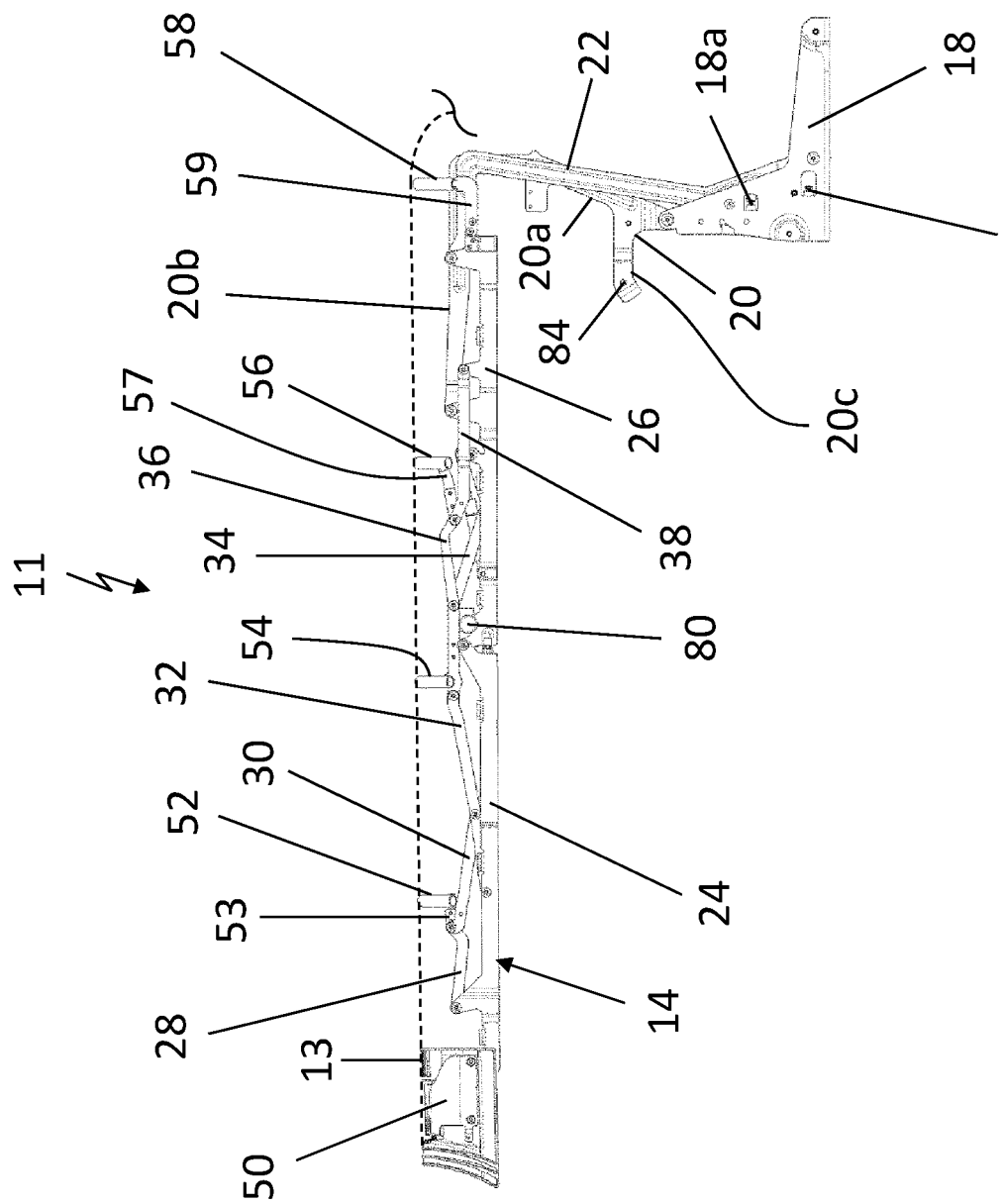
FIG. 6 is a side view of the top linkage of FIG. 3 in the covering position together with the top cover.
Figure 7:
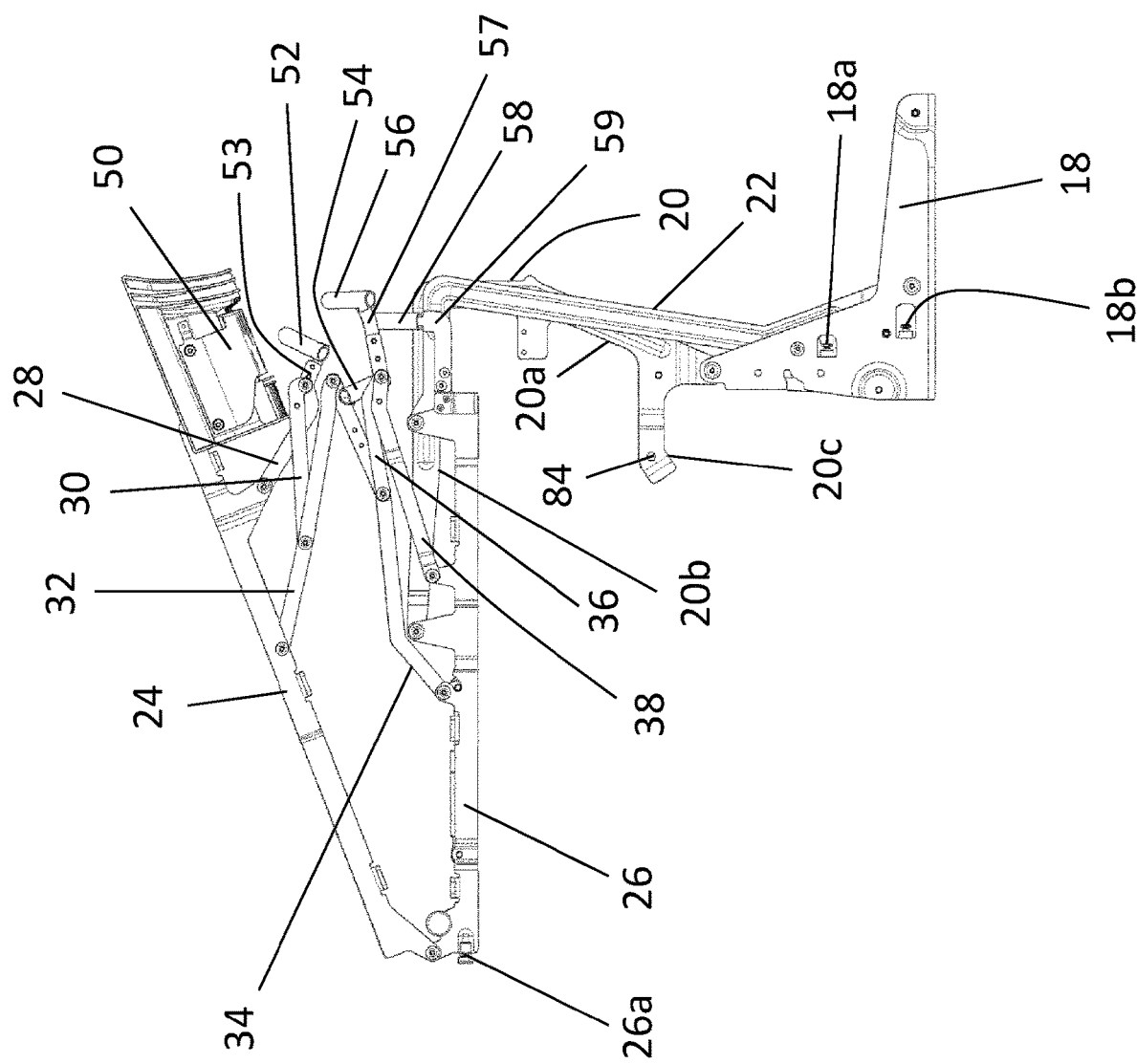
FIG. 7 is a side view of the top linkage of FIG. 3 in the intermediate position.

As can be seen in FIGS. 3 and 4, two driving elements 60, 62 are connected to link assembly 14, said driving elements 60, 62 each being formed by a gas pressure spring and aiding displacement of top linkage 12. Driving element 60 is supported on main bearing 18 in attachment to the vehicle and engages first main link 14. Driving element 62 is supported on rear roof link 26 and engages bow link 28.

Top 11 can be actuated in the manner described below.

In the covering position of top 11, in which top 11 covers the vehicle interior, top 11 is secured by securing elements 64 disposed on front bow 50 and by locking devices 80 disposed on either side of the vertical longitudinal center plane of the vehicle, unintentional displacement of top 11 thus being precluded. Lock elements 82 are each engaged with respective vehicle-attached second lock counterelement 86.

Starting from the covering position, top 11 can be displaced into the intermediate position, in which the vehicle interior is partially uncovered, by displacing top linkage 12. To do so, securing elements 64 are released and front roof links 24 of bilaterally disposed link assemblies 14 are each pivoted rearward in the longitudinal direction of the vehicle.

In order to displace top 11 from the intermediate position into the storage position, lock elements 82 are each manually subjected to a force which acts outward in the transverse direction of the vehicle and which is greater than the spring force of springs 88 and which moves lock elements 82 from the engaged position outward in the transverse direction of the vehicle. Then, top linkage 12, in particular first and second main links 20 and 22, are pivoted rearward in the longitudinal direction of the vehicle until first main links 20 each come into contact with respective second stop element 18b. During this displacement, lock elements 82 each collide with protrusion 20c of respective link assembly 14, whereby lock elements 82 are positively moved outward in the transverse direction of the vehicle against the spring force by the ramps, are guided toward respective lock counterelement 84, and latch into recess 84a upon reaching it.

In order to displace top 11 from the storage position into the intermediate position or into the covering position via the intermediate position, lock elements 82 are each subjected to a force which acts outward in the transverse direction of the vehicle and which is greater than the spring force of springs 88, lock elements 82 thus being displaced outward in the transverse direction of the vehicle from the engaged position into an open position and top linkage 12 being released. Starting from the storage position, top linkage 12 is then pivoted forward in the longitudinal direction of the vehicle.

In the embodiment illustrated in FIGS. 11a and 12a, lock elements 82 collide with respective second lock element 86, further displacement thus being prevented. Subsequently, lock elements 82 are each subjected to a force which acts outward in the transverse direction of the vehicle and which that is greater than the spring force of springs 88 and which moves lock elements 82 from the engaged position outward in the transverse direction of the vehicle. Thus, top linkage 12 can be pivoted further until lock elements 82 are located opposite recesses 86a of lock counterelements 86. If the force acting on lock elements 82 is subsequently released, lock elements 82 return to the engaged position. In doing so, they enter recesses 86a of lock counterelements 86.

As shown in FIGS. 11b and 12b, lock elements 86 can alternatively each comprise a bevel 86b which positively shifts respective lock element 82 outward in the transverse direction of the vehicle against the spring force of respective spring 88 as top linkage 12 is being displaced. Subsequently, upon arrival at recess 86a of respective lock counterelement 86, lock elements 82 automatically return to the engaged position because of the spring force of respective springs 88 acting inward in the transverse direction of the vehicle, top linkage 12 thus being secured.

In order to displace top 11 from the intermediate position into the covering position, front roof links 24 are pivoted forward in the longitudinal direction of the vehicle until front bow 50 comes into contact with front header 17 of convertible vehicle 10, the top linkage subsequently being secured thereto by means of securing elements 64.

REFERENCE SIGNS 10 convertible vehicle
11 top
12 top linkage
13 top cover
14 link assembly
16 roll bar
17 front header
18 vehicle-attached main bearing
18a stop element
18b stop element
20 first main link
20a long leg
20b short leg
20c protrusion
22 second main link
24 front roof link
26 rear roof link
26a stop element
28 bow link
30 coupling link
32 link
34 bow link
36 bow link
38 link
50 front bow
52 transverse bow
53 bow holder
54 transverse bow
56 transverse bow
57 bow holder
58 transverse bow
59 bow holder
60 driving element
62 driving element
64 securing element
80 locking device
82 lock element
82a knob
82b shaft
84 first lock counterelement
84a recess
86 second lock counterelement
86a recess
86b bevel
88 spring
90 securing ring

The invention claimed is:

1. A top for a convertible vehicle, comprising: a top cover and a top linkage which is displaceable between a covering position, in which a vehicle interior is covered, and a storage position, in which the vehicle interior is uncovered, and which comprises a link assembly on either side of a vertical longitudinal center plane of the vehicle, each link assembly being pivotably mounted on a vehicle-attached main bearing and securable in at least two positions of the top linkage by means of a locking device comprising a lock element disposed on a first link of the link assembly, a first lock counterelement, and a second vehicle-attached lock counterelement, wherein the first lock counterelement of each locking device is disposed on a second link of the respective link assembly;
wherein the lock elements each comprise a spring device which acts in the direction of an engaged position.

2. The top according to claim 1, wherein the lock elements and the respective second lock counterelements together secure the top linkage in the storage position.

3. The top according to claim 1, wherein the lock elements and the second lock counterelements secure the top linkage in the covering position and/or in an intermediate position in which the vehicle interior is partially uncovered.

4. The top according to claim 1, wherein the first links of the link assemblies are each formed by a roof link which extends in the longitudinal direction of the top when the top is in the covering position, the second links of the link assemblies are each formed by a main link pivotably mounted on a main bearing, and the roof links are each pivotably connected to the respective main link.

5. The top according to claim 4, wherein the main links each comprise a long leg which extends in the vertical direction of the vehicle and which is pivotably mounted on the respective vehicle-attached main bearing and a short leg which extends in the longitudinal direction of the vehicle, a protrusion which extends forward in the longitudinal direction of the vehicle and on which the respective first lock counterelement is formed and which preferably forms a ramp for the lock element being formed on each of the long legs.

6. The top according to claim 4, wherein the roof links of the bilaterally disposed link assemblies are each pivotably connected to a front roof link.

7. The top according to claim 1, wherein the lock elements each comprise a cylindrical shaft and a knob.

8. The top according to claim 1, wherein the spring devices each comprise a spring and a securing element which secures the spring on the respective lock element.

9. The top according to claim 1, wherein the lock counterelements each comprise a recess which corresponds to the respective lock element.

10. The top according to claim 1, wherein the second lock counterelements each comprise a bevel which serves as a ramp for the respective lock element.

11. The top according to claim 5 wherein the bilaterally disposed link assemblies each comprise a main four-bar linkage which is formed by the main link mounted pivotably in attachment to the vehicle, by the roof link, and by a second main link mounted pivotably in attachment to the vehicle.

12. A convertible vehicle, comprising a top according to claim 1.

13. The convertible vehicle according to claim 12, wherein a roll cage which comprises, on either side of the vertical longitudinal center plane of the vehicle, a roll bar which extends in the longitudinal direction of the vehicle and on which the second lock counterelement of the locking device is disposed.

\* \* \* \* \*